(12) United States Patent
Giere

(10) Patent No.: US 6,213,883 B1
(45) Date of Patent: *Apr. 10, 2001

(54) FLEXIBLE COUPLING FOR STEERABLE DRIVE SHAFT

(76) Inventor: David W. Giere, 1609½ S. Center Ave., Sioux Falls, SD (US) 57105

( * ) Notice: Subject to any disclaimer, the term of this patent is extended or adjusted under 35 U.S.C. 154(b) by 0 days.

This patent is subject to a terminal disclaimer.

(21) Appl. No.: 09/123,104

(22) Filed: Jul. 27, 1998

Related U.S. Application Data

(63) Continuation-in-part of application No. 08/746,374, filed on Nov. 8, 1996, now Pat. No. 5,951,400, which is a continuation-in-part of application No. 08/415,667, filed on Apr. 3, 1995, now abandoned.

(51) Int. Cl.[7] ............................................. F16D 3/52
(52) U.S. Cl. ................................... 464/99; 464/93
(58) Field of Search ................................ 464/87, 92, 93, 464/94, 96, 98, 99, 147, 904

(56) References Cited

U.S. PATENT DOCUMENTS

| | | | |
|---|---|---|---|
| 1,789,497 | * | 1/1931 | Potter .................................. 464/99 X |
| 3,230,738 | * | 1/1966 | Seigel ..................................... 464/99 |
| 3,985,000 | * | 10/1976 | Hartz ...................................... 464/99 |
| 4,055,966 | * | 11/1977 | Fredericks ............................... 464/99 |
| 4,214,457 | * | 7/1980 | Wade et al. ............................. 464/99 |
| 4,744,783 | * | 5/1988 | Downey et al. ........................ 464/99 |
| 5,222,913 | * | 6/1993 | Nagashima ............................. 464/93 |
| 5,286,231 | * | 2/1994 | Zilberman et al. ..................... 464/93 |
| 5,951,400 | * | 9/1999 | Giere ...................................... 464/99 |

* cited by examiner

Primary Examiner—Lynne H. Browne
Assistant Examiner—Greg Binda
(74) Attorney, Agent, or Firm—Hugh D. Jaeger

(57) ABSTRACT

A flexible coupling for use in connecting a vehicle's drive shaft to a vehicle's wheel flange. The coupling includes first and second flexible disc members with opposed portions of the first flexible disc member rigidly connected to each other and to opposed portions on the second flexible disc member.

6 Claims, 20 Drawing Sheets

FIG. 3

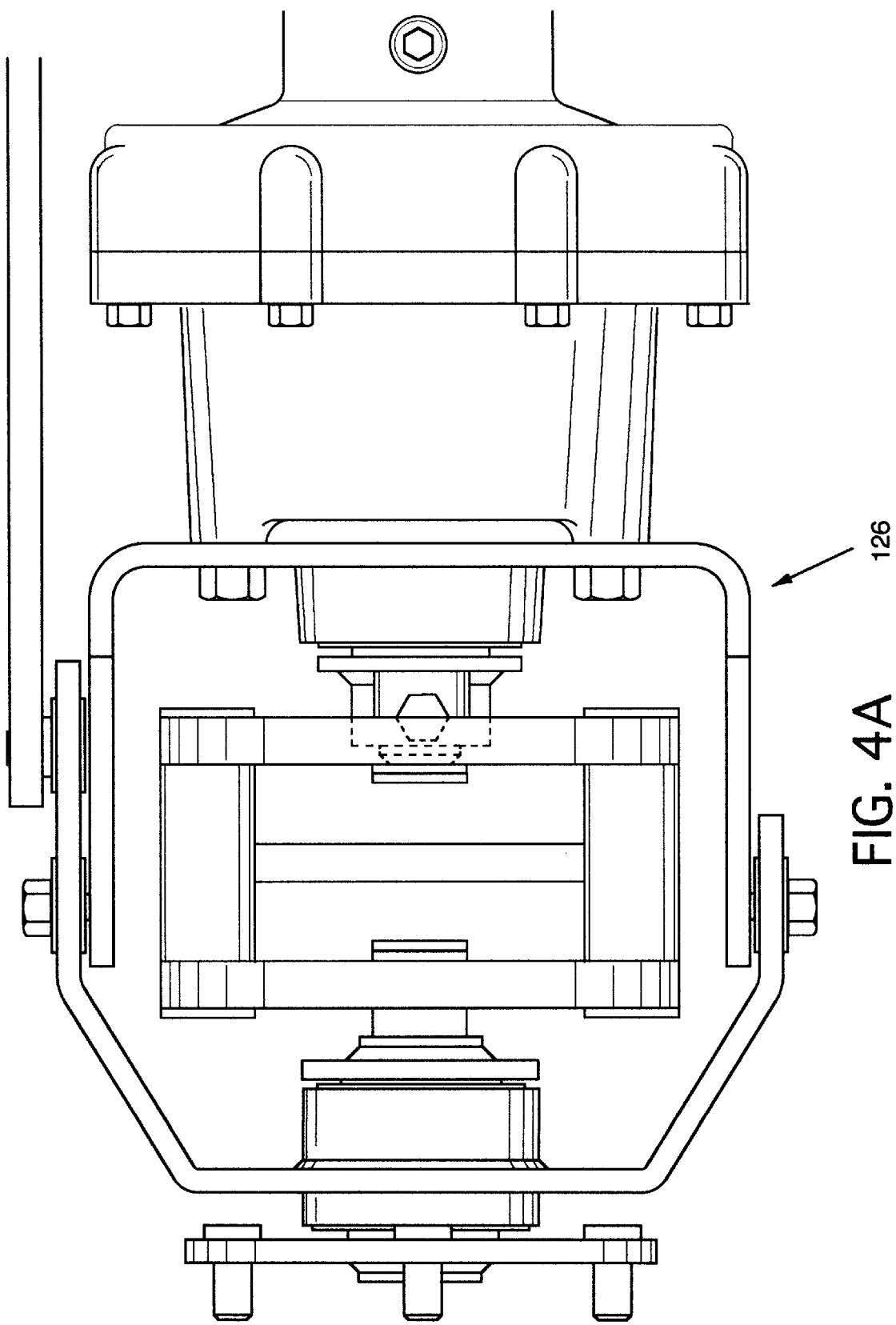

2

FLEXIBLE COUPLING FOR STEERABLE DRIVE SHAFT

CROSS REFERENCES TO CO-PENDING APPLICATIONS

This patent application is a continuation-in-part of Ser. No. 08/746,374 entitled "Constant Velocity Flexible Coupling" filed on Nov. 8, 1996, now U.S. Pat. No. 5,951,400, which is a continuation-in-part of Serial No. 08/415,667 entitled "Constant Velocity Flexible Coupling" filed on Apr. 3, 1995, now abandoned, by the same inventor.

BACKGROUND OF THE INVENTION

1. Field of the Invention

The present invention is for a constant velocity flexible coupling, and more particularly, pertains to a flexible disc coupled mechanism similar in function to a universal drive joint for use in 4-wheel drive steer devices, such as a 4-wheel drive lawn mower or other such vehicles.

2. Description of the Prior Art

Four-wheel drive and steer mechanisms have been reserved for high end expensive commercial and industrial equipment ranging in the tens of thousands of dollars. The methods used to achieve power delivery through a pivoting steerable mechanism are effective and durable, but not in the same class as the smaller and more inexpensive and smaller lawn tractors intended for general consumer use. The cost is high and many do not even use CV-joints. Four-wheel drive farm tractors and utility tractors use designs far too expensive and are similar in design to units utilized in front wheel drive cars.

Another problem with prior art devices is that of offering a low speed flexible coupling that can function effectively up to 50° angles and yet fit in a relatively short (axial) space and require no sliding connections such as splines for absorbing axial reciprocation. The present invention uses no such spline devices and as such can be fabricated for a much more reasonable price. Four-wheel drive/steer mechanisms have been incorporated in some prior art lawn tractors, but steering and drive devices have limited the steering angle to a low range of steering at approximately 20°.

Although disc-type flexible joints are not new, the turning radius of single disc-type flexible joints are limited by the geometry of the single flexible disc. The present invention overcomes this problem by utilizing two flexible disc members coupled by an intermediate joint connector about which both discs flex.

Clearly, what is needed is an inexpensive, yet effective and durable drive steer coupling providing for an increased turn angle for use in small vehicles, such as provided by the present invention.

SUMMARY OF THE INVENTION

The general purpose of the present invention is a constant velocity flexible coupling for use in driving the wheels of a small wheeled vehicle that is powered and steered through each of its four wheels.

According to one embodiment of the present invention, there is provided a constant velocity flexible coupling. An output shaft of a differential unit couples to a first yoke which is connected to an inner flexible disc with optional reinforced metal inserts at the securation points. At 90° to the first yoke, an intermediate joint connector is fastened to the first disc. A second disc also attaches to the common joint connector and is parallel and opposite the first disc. A second yoke attaches to the second disc and is oriented 90° to the common joint connector and is aligned to the first yoke. The second yoke attaches to a shaft and a wheel flange which are secured to a pivotal wheel bearing housing which pivots about a mounting bracket secured to one end of differential housing members.

According to one embodiment of the present invention, there is provided a flexible coupling, including flexible discs separated by a geometric space.

One significant aspect and feature of the present invention is a constant velocity flexible coupling which is simple in design and which is inexpensive.

Another significant aspect and feature of the present invention is the utilization of parallel flexible disc members coupled centrally by a joint connector in conjunction with yoke members oriented at 90° to the centrally located joint connector.

Yet another significant aspect and feature of the present invention is the flexing of discs about a central common joint connector.

Still additional significant aspect and feature of the present invention is the flexing of discs about the ends of yoke members.

An additional significant aspect and feature of the present invention is a constant velocity flexible coupling which turns and provides drive force at very severe angles such as up to 50°.

A further significant aspect and feature of the present invention is a constant velocity flexible coupling used in conjunction with a 4-wheel drive, 4-wheel steer lawn tractor or other such vehicles.

A still further significant aspect and feature of the present invention is the utilization of flexibly aligned discs to absorb axial reciprocation. The self-aligning tendencies of the discs which assist in returning a wheel to the straight ahead position when steering inputs are reduced or neutralized.

Having thus described embodiments of the present invention, it is the principal object of the present invention to provide a constant velocity flexible coupling.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3 illustrates the alignment of FIGS. 4A–4B and of FIGS. 5A–5B;

FIGS. 4A–4B illustrate a side view of constant velocity flexible couplings utilized at opposing ends of a differential drive assembly;

Figure 16:
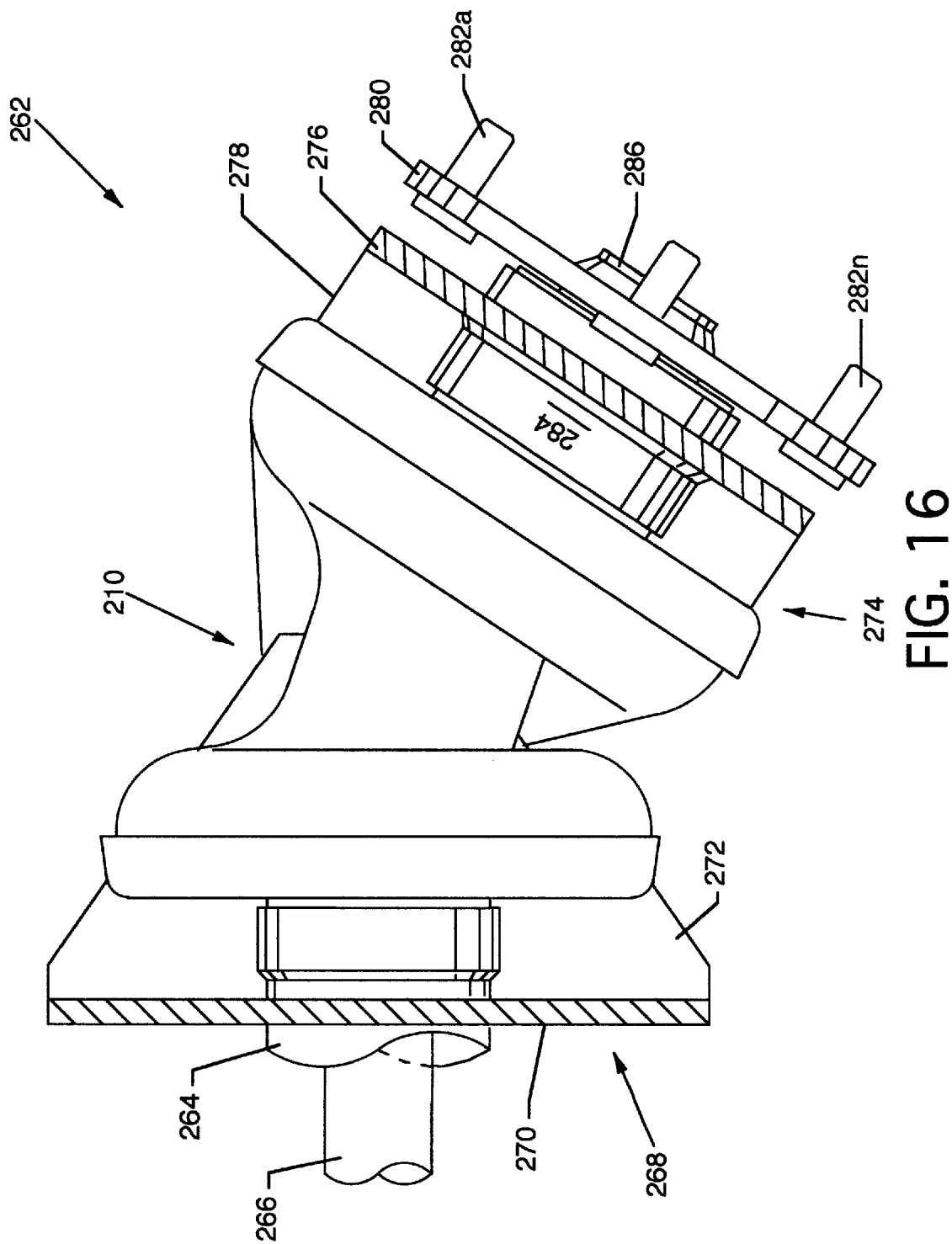
Figure 17:
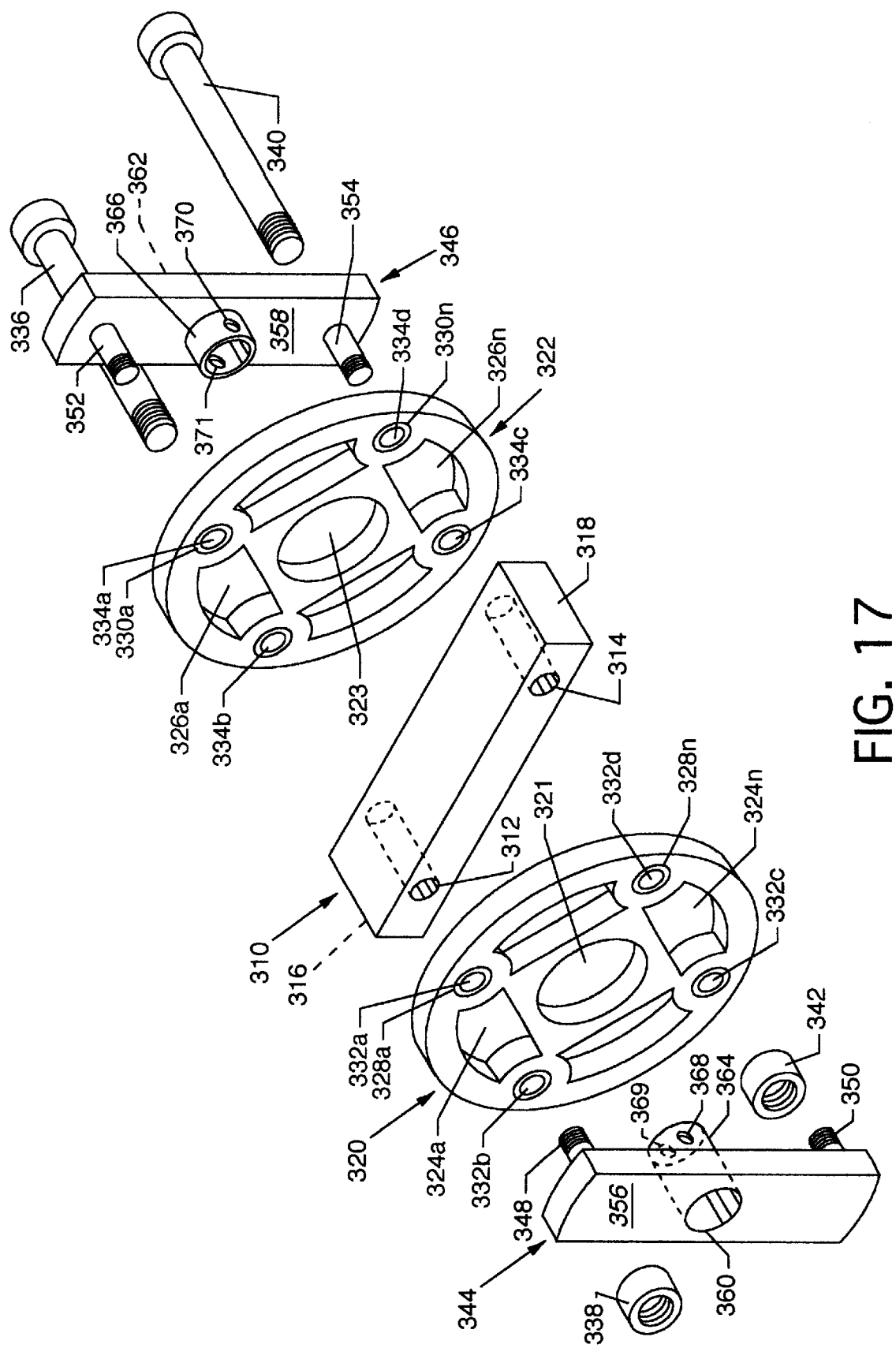
Figure 18:
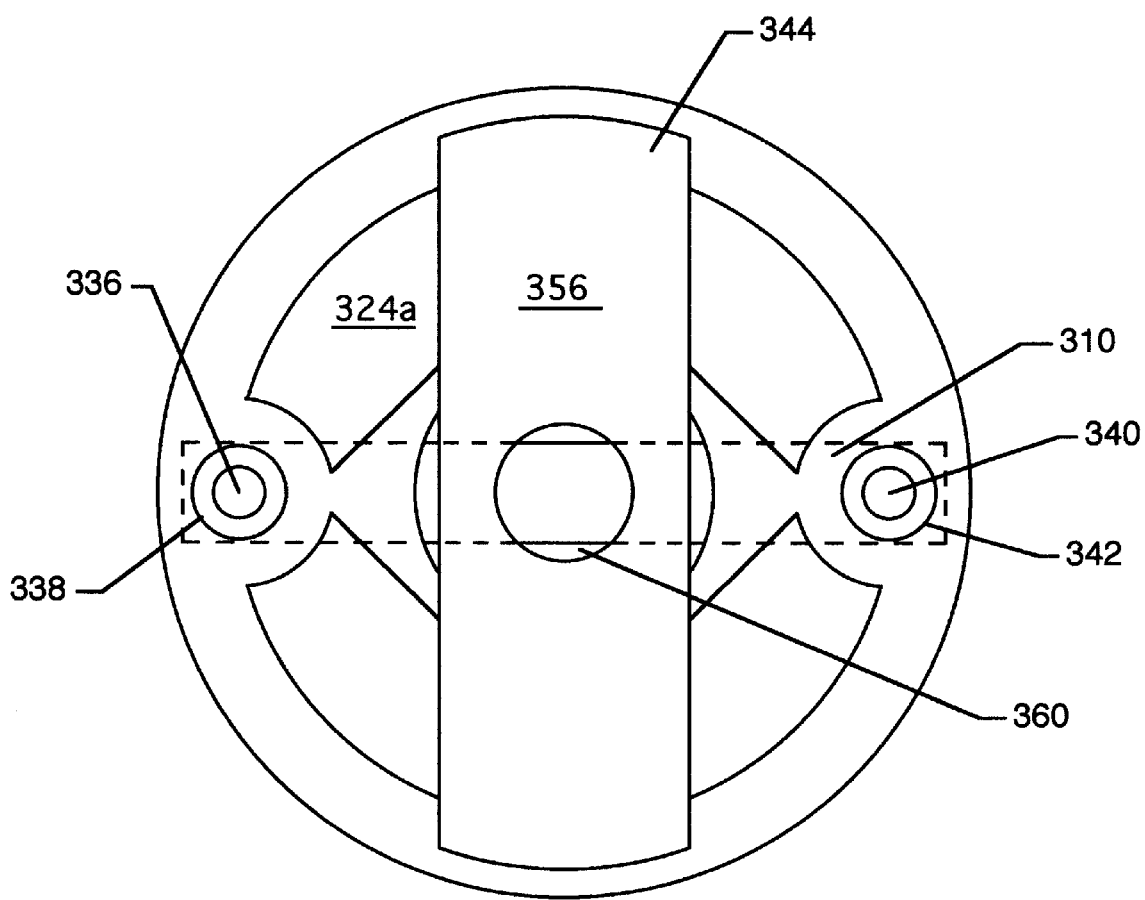

PIG. 15 illustrates a cross-sectional view of the constant velocity flexible interface;

FIG. 16 illustrates a cutaway view of the constant velocity flexible coupling in a turn to the left incorporating the constant velocity flexible interface;

FIG. 17 illustrates an exploded view of the fourth alternative embodiment; and,

FIG. 18 illustrates a side view of the fourth alternative embodiment.

DETAILED DESCRIPTION OF THE PREFERRED EMBODIMENTS

Figure 1:
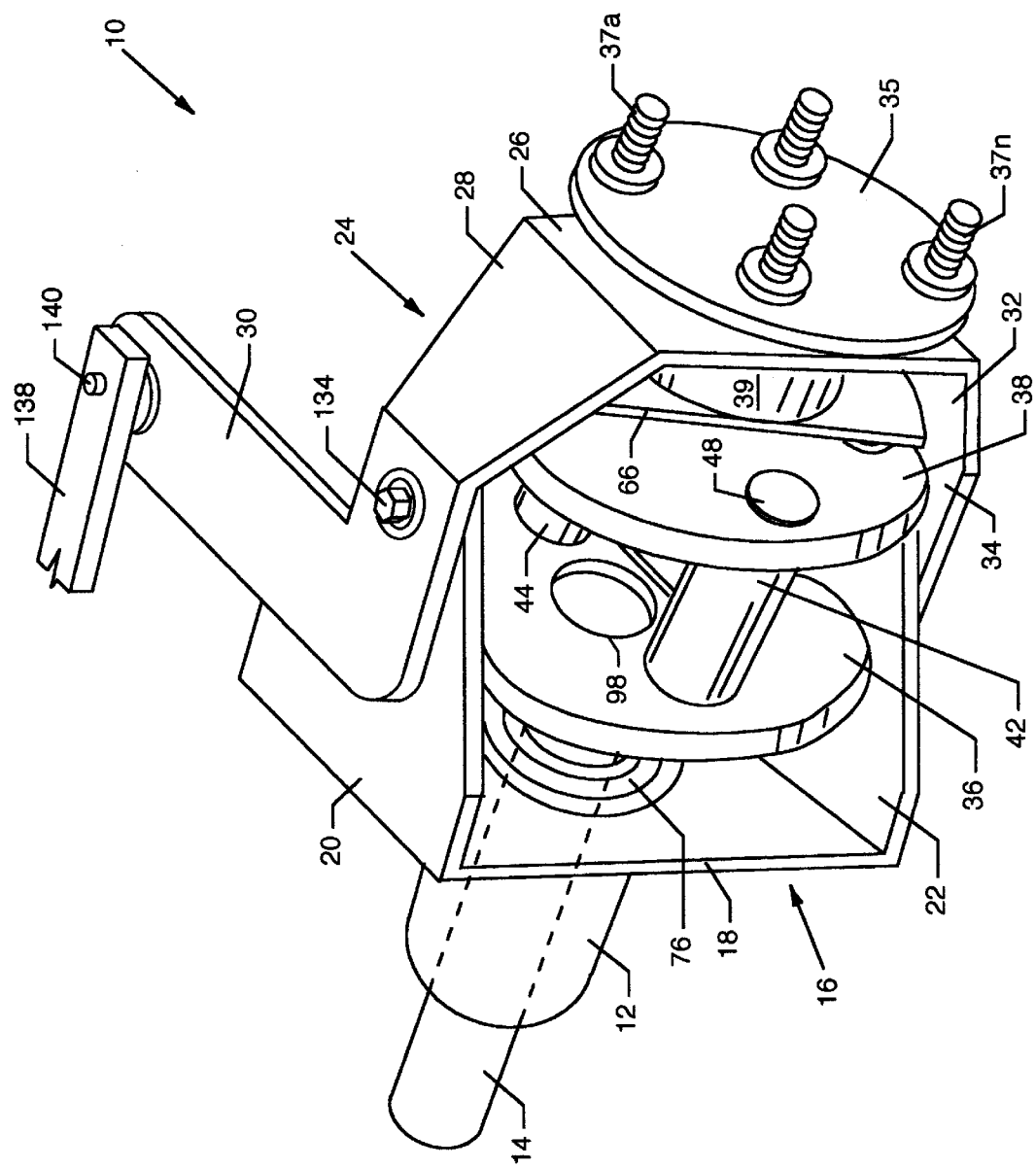
FIG. 1 illustrates a perspective view of a constant velocity flexible coupling, the present invention.

FIG. 1 illustrates a perspective view of a constant velocity flexible coupling 10 secured to a housing member 12 and a shaft member 14 of a differential drive later illustrated in the following figures. Visible in FIG. 1 is a mounting bracket 16 having a planar vertical member 18, a horizontally aligned planar top member 20 generally in the shape of a triangle, and a similarly shaped horizontally aligned planar bottom member 22. A wheel bearing housing 24, which functions also as a pivot bracket, pivotally aligns and secures over and about the outer ends of the mounting bracket top member 20 and bottom member 22, respectively. The one piece wheel bearing housing 24 includes a plurality of planar members including a vertically aligned planar member 26, an angled planar member 28 extending upwardly and inwardly from the vertically aligned planar member 26, an L-shaped planar bell crank member 30 being pivotally secured to the top member 20 of the mounting bracket 16, an angled planar member 32 extending downwardly and inwardly from the vertically aligned planar member 26 and a planar member 34 being pivotally secured to the bottom member 22 of the mounting bracket 16. The differential drive housing member 12 secures through the vertical planar member 18 of the mounting bracket 16. Shaft 14 rotates members located between the mounting bracket 16 and the wheel bearing housing 24 including an inner flexible disc 36 and an outer flexible disc 38 of rubber, polyurethane, urethane elastomers, polymers or other suitable materials. A wheel flange 35 having a plurality of studs 37a–37n aligns in a bearing 39 secured to the wheel bearing housing 24. An exploded view of these component members is illustrated in FIG. 2 and an assembled view is illustrated in FIG. 4B.

Figure 2:
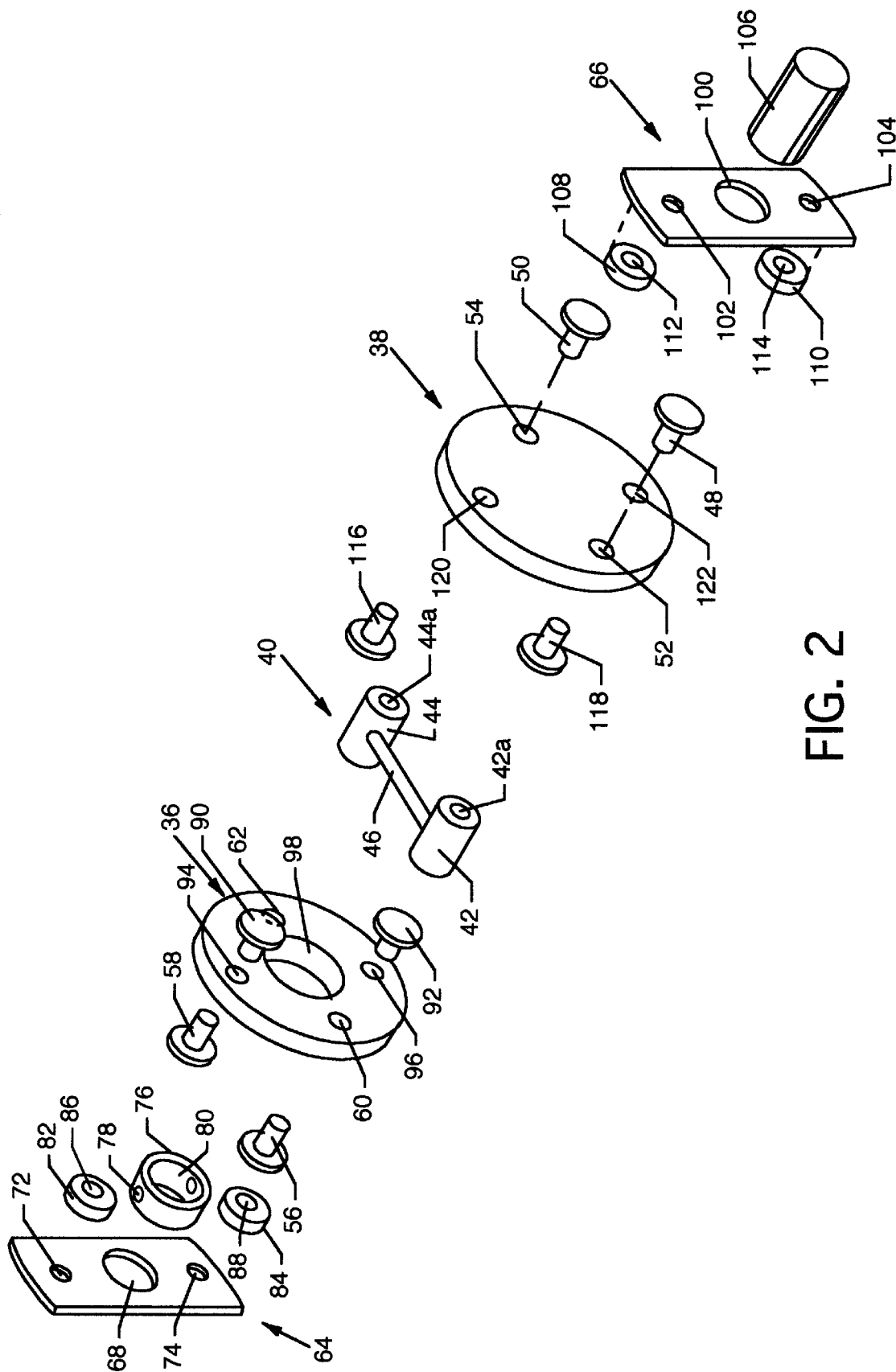
FIG. 2 illustrates an exploded view of the inner drive components which align between the mounting bracket and the wheel bearing housing.

FIG. 2 illustrates an exploded view of the inner drive components which align between the mounting bracket 16 and the wheel bearing housing 24 of FIG. 1, where all numerals correspond to those elements previously and otherwise described. A joint connector 40 secures between the flexible inner and outer discs 36 and 38. Opposing cylindrical members 42 and 44, including central bores 42a and 44a, respectively, are mutually secured by a central connecting rod member 46 to form the joint connector 40. The inner and outer flexible discs 36 and 38 secure to the joint connector 40 by a plurality of fasteners. Fasteners 48 and 50 extend through opposing holes 52 and 54 in the outer flexible disc 38 to frictionally engage one end of bores 42a and 44a of the joint connector 40. In a like and similar fashion, fasteners 56 and 58 extend through holes 60 and 62 in the inner flexible disc 36 to frictionally engage the unoccupied end of bores 42a and 44a of the joint connector 40. Inner and outer yokes 64 and 66 align and secure to the inner and outer flexible discs 36 and 38 at points 90° from the attachment of the cylindrical members 42 and 44. Yoke 64 includes a central bore 68 and opposing outer bores 72 and 74. A yoke bushing 76 having a fastener bore 78 and a central bore 80 aligns and secures, such as by a weldment, to the bore 68 of the yoke 64. Yoke bushing 76 accommodates the end of the shaft member 14 illustrated in FIG. 1. Spacers 82 and 84 having central bores 86 and 88 align and secure, such as by weldment, to outer bores 72 and 74, respectively, on the inner yoke 64. Fasteners 90 and 92 extend through holes 94 and 96 of the inner flexible disc 36 to frictionally engage holes 86 and 88 of the yoke spacers 82 and 84, thus securing the yoke 64 to the inner flexible disc 36. A hole 98 is centrally located in the inner flexible disc 36 to accommodate the yoke bushing 76 and the end of shaft 14, if required. The outer flexible disc 38 secures to the outer yoke 66 in much the same manner and fashion. Yoke 66 includes a central bore 100 and opposing outer bores 102 and 104. A shaft 106 aligns and secures, such as by a weldment, to the central bore 100. Shaft 106 aligns in a bearing 39 on the wheel bearing housing 24 illustrated in FIGS. 4A–4B. Spacers 108 and 110 having central bores 112 and 114 align and secure, such as by a weldment, to the outer bores 102 and 104, respectively, of the outer yoke 66. Fasteners 116 and 118 extend through holes 120 and 122 in the outer flexible disc 38 to frictionally engage holes 112 and 114 of the yoke spacers 108 and 110, thus securing the yoke 66 to the outer flexible disc 38.

Figure 4B:
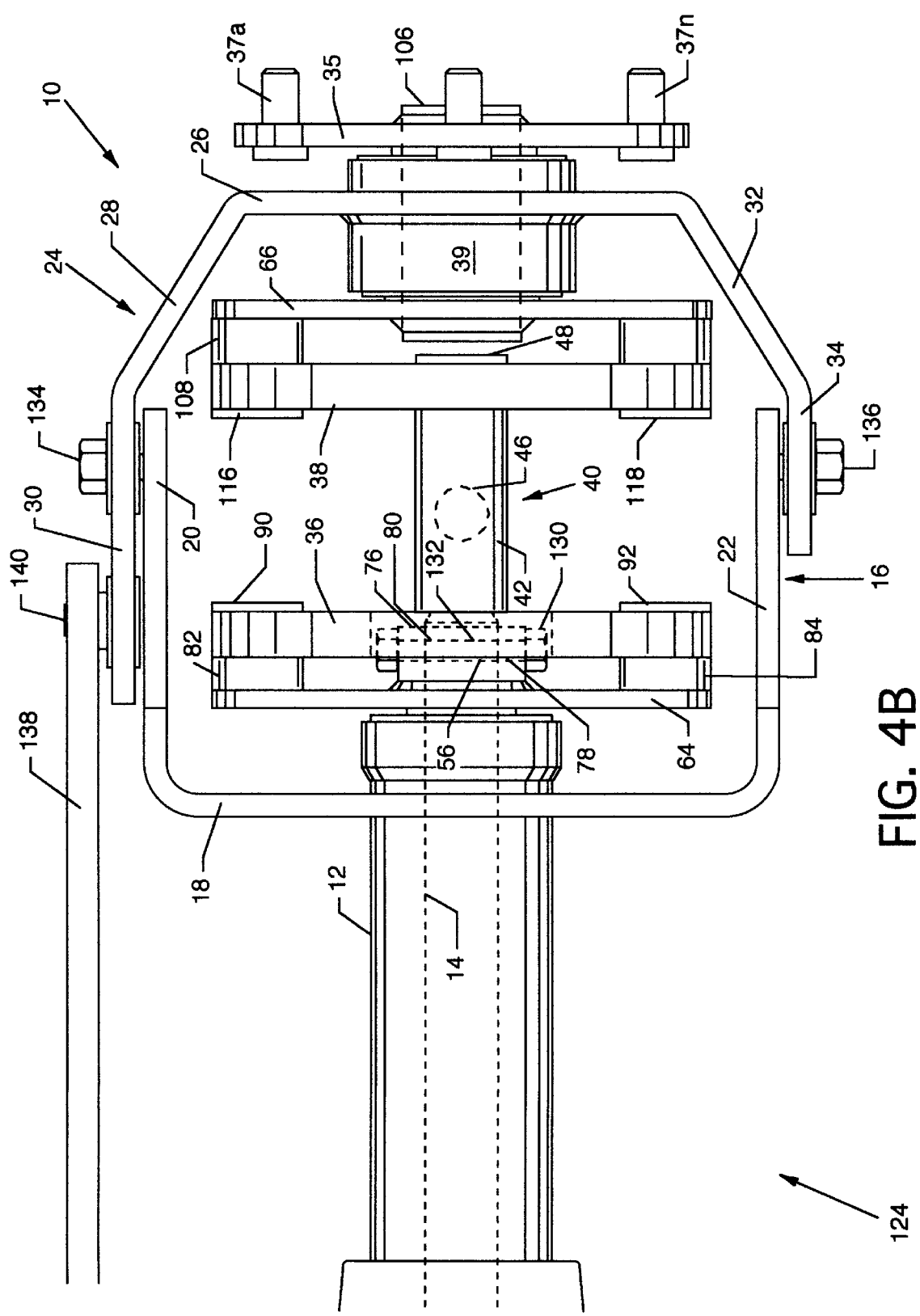

FIG. 3 illustrates the alignment of FIGS. 4A–4B and FIGS. 5A–5B. FIGS. 4A–4B illustrate a side view of a constant velocity flexible coupling 10 incorporated into use with a differential drive assembly 124. Another constant velocity drive assembly 126 constructed in a fashion similar to the constant velocity flexible coupling 10 is located opposing the constant velocity flexible coupling 10 on the opposing end of the differential drive assembly 124, where all numerals correspond to those elements previously and otherwise described. Constant velocity drive assembly 126, being similar in construction to constant velocity drive assembly, is not described for purposes of brevity.

Shaft 14 extends from the end of the housing member 12 into the central bore 80 of the yoke busing 76 and is secured therein by a nut and bolt assembly 130 extending through the fastener bore 78 and a corresponding bore 132 in the end of the shaft member 14, thus coupling the differential drive assembly 126 to the inner components of the constant velocity flexible coupling 10. Shaft 106 extends from the outer yoke 66 through and is supported by the wheel bearing housing mounted bearing 39 and further extends through and secures to the wheel flange 35 to couple the outer components of the constant velocity flexible coupling 10 to the wheel flange 35 and the wheel bearing housing 24. The upper portion of the wheel bearing housing 24 pivotally secures to the top planar member 20 of the mounting bracket 16 by engagement of an upper pivot bolt and washer assembly 134 with the top planar bell crank member 30 of the wheel bearing housing 24. In a similar fashion the lower portion of the wheel bearing housing 24 pivotally secures to the bottom planar member 22 of the mounting bracket 16 by engagement of a lower pivot bolt and washer assembly 136 with the lower planar member 34 of the wheel bearing housing 24. A control link 138 pivotally secures to the bell crank member 30 by a pivot member 140 and extends to connect to the opposing constant velocity flexible coupling 126 to provide for simultaneous steering of constant velocity flexible couplings 10 and 126 when connected to the steering mechanism of a vehicle such as a small rider lawn mower or other vehicle in which the invention is utilized.

MODE OF OPERATION

Figure 5A:
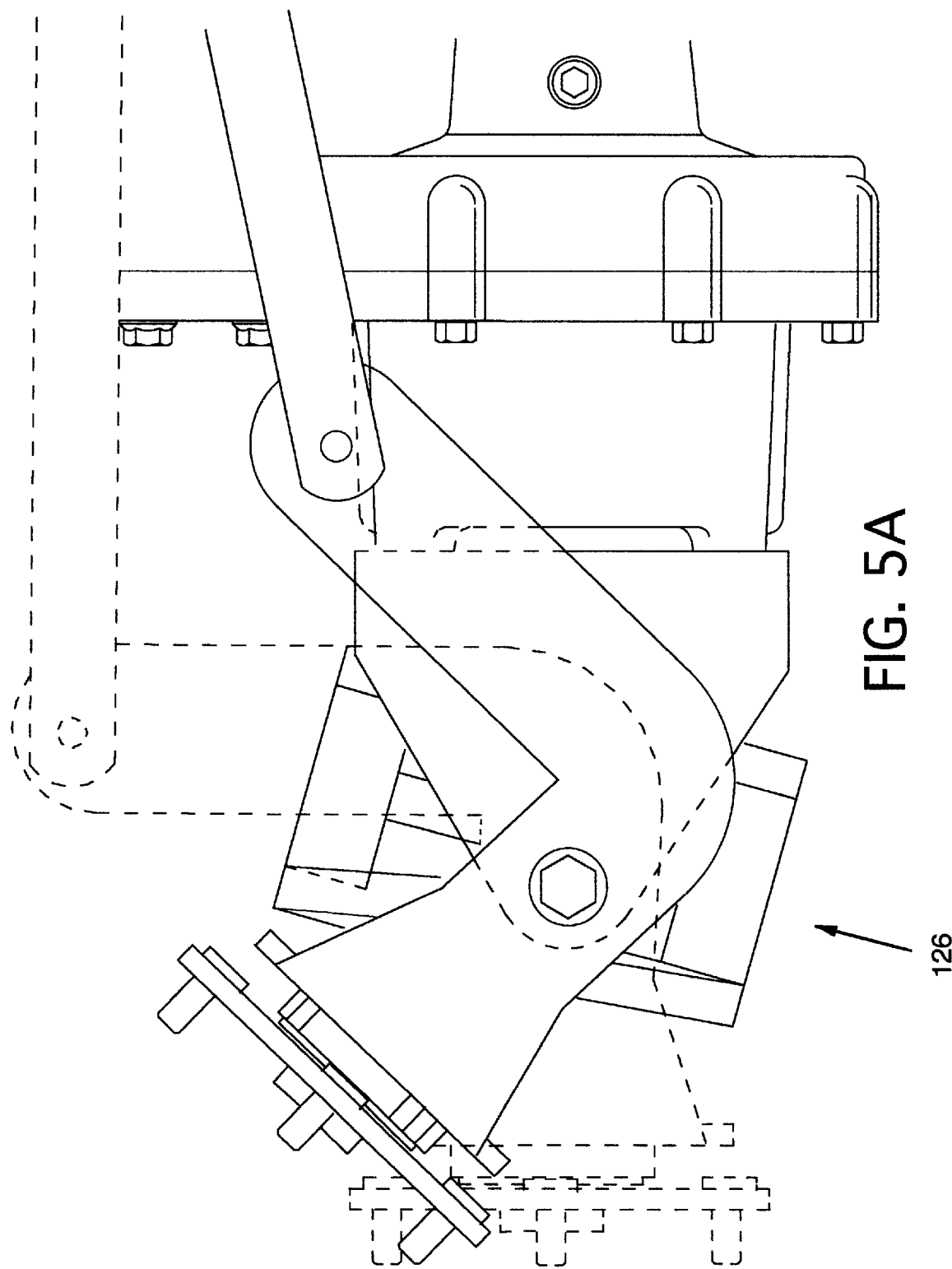
FIGS. 5A–5B illustrate a top view of a differential assembly and opposing flexible couplings of FIGS. 4A–4B.
Figure 5B:
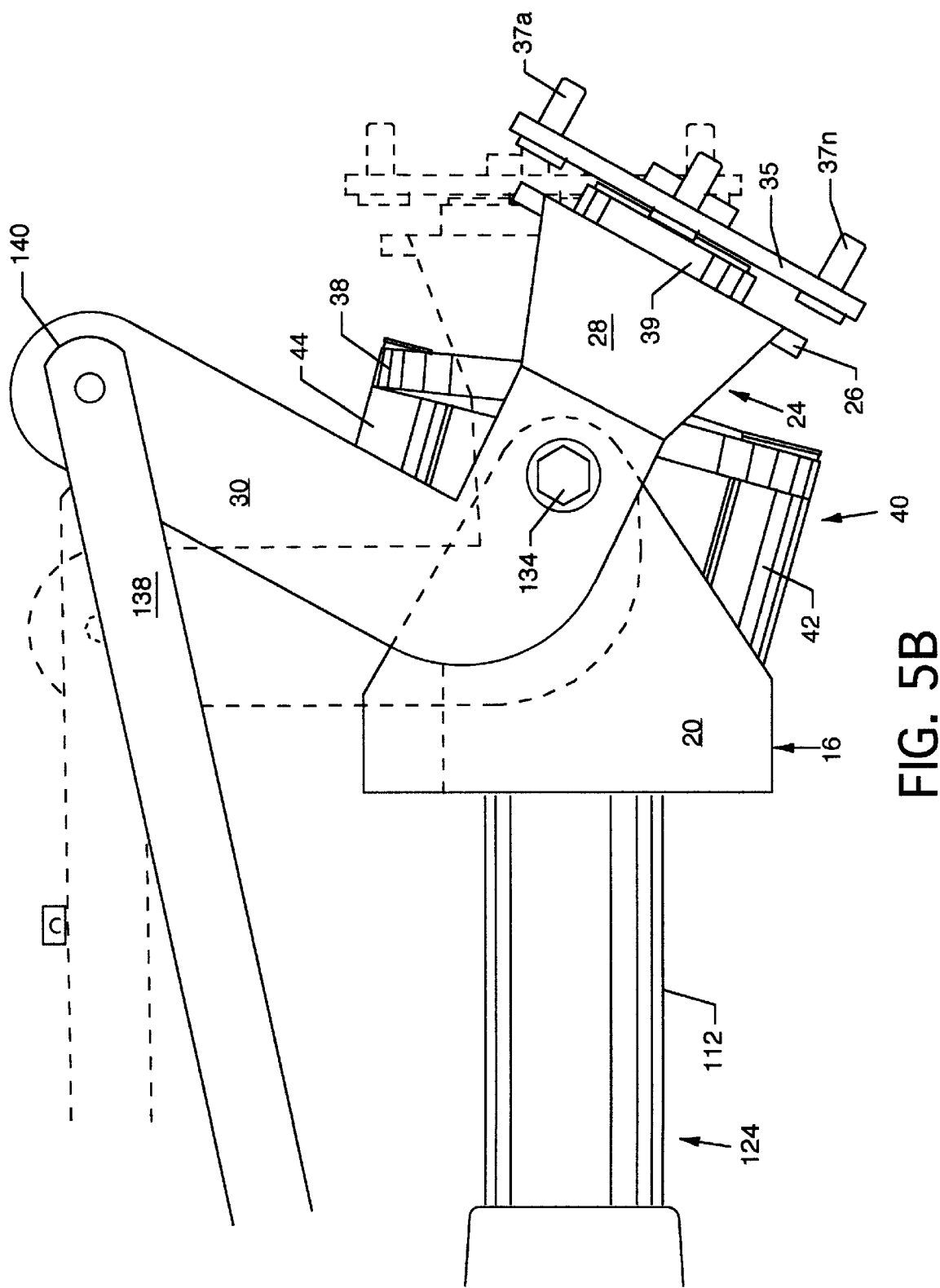

FIGS. 5A–5B illustrate a top view of the differential assembly 124 and opposing constant velocity flexible couplings 10 and 126 secured to each end. The static steering mode of operation is illustrated in dashed lines indicating straight ahead steering. Actuation of the control link 138 to the right by a vehicle steering mechanism, as in a turn to the left, causes the bell crank 30 to be positioned, as illustrated in solid lines, thus causing the wheel bearing housing 24 to pivot about the upper and lower pivot bolt and washer assemblies 134 and 136 of FIGS. 4A–4B. Pivoting of the wheel bearing housing 24 causes the inner flexible disc 36, of FIGS. 4A–4B, and the outer disc 38 to flex. Flexing about various component members occurs as the wheel flange 35 is propelled by the differential drive assembly 124 as illustrated in FIGS. 6 and 7.

Figure 6:
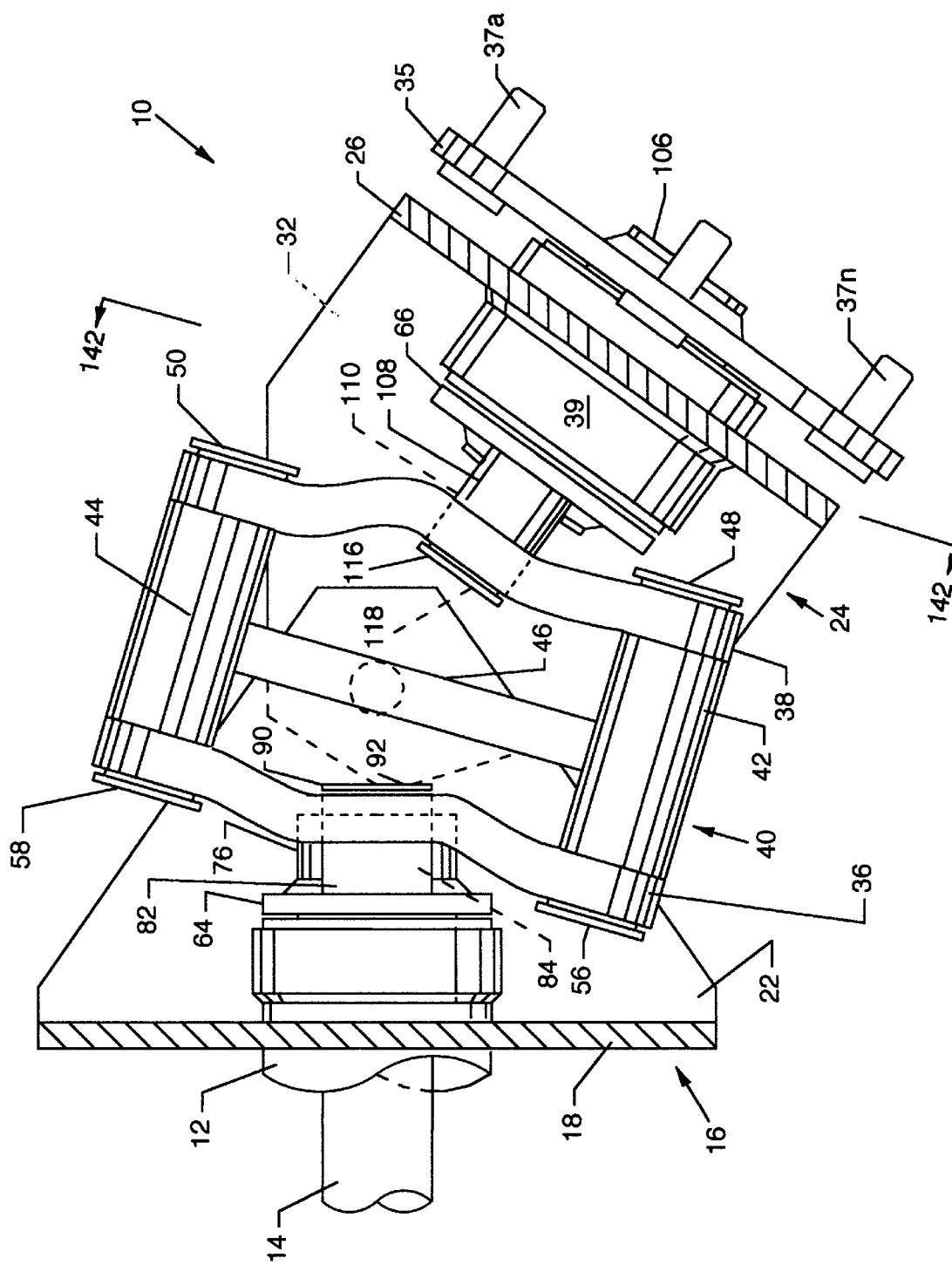
FIG. 6 illustrates a cutaway view of the constant velocity flexible coupling 10 in a turn to the left.

FIG. 6 illustrates a cutaway view of the constant velocity flexible coupling 10 in a turn to the left illustrating the flexing of the inner and outer flexible discs 36 and 38 where the joint connector 40 is positioned in horizontal alignment at a point in time during rotation. In the straight ahead and in the turn, steering mode power is delivered from the shaft 14, through the yoke 64 and its respective spacers 82 and 84, through the inner flexible disc 36, through the joint connector 40, through the outer flexible disc 38, through the yoke 66 and its respective spacers 108 and 110, and finally through shaft 106 to the wheel flange 35. As the flexible discs 36 and 38 rotate, and as a turning action is imitated by the control link 138 of FIGS. 5A–5B, the shafts 14 and 106 are removed from concentric alignment to be angularly displaced from each other thereby causing the flexible discs 36 and 38 to flex and distort in a mirror image-like fashion about a vertical axis while the joint connector 40 is horizontal, such as exhibited and seen from a view line 142 where the vertical axis of the outer disc 38 is described as a line extending through the zone from the spacer 108 to the spacer 110 where contact with the flexible disc 38 is made or, in other words, from the 12 o'clock position to the 6 o'clock position on the disc 38. A similar vertical axis exists between the zone where spacers 82 and 84 align to the flexible disc 36. As can be seen from the illustration, discs 36 and 38 flex about these vertical axii, thus flexing the flexible discs 36 and 38 between the respective ends of the cylindrical members 42 and 44 of the joint connector 40.

Figure 7:
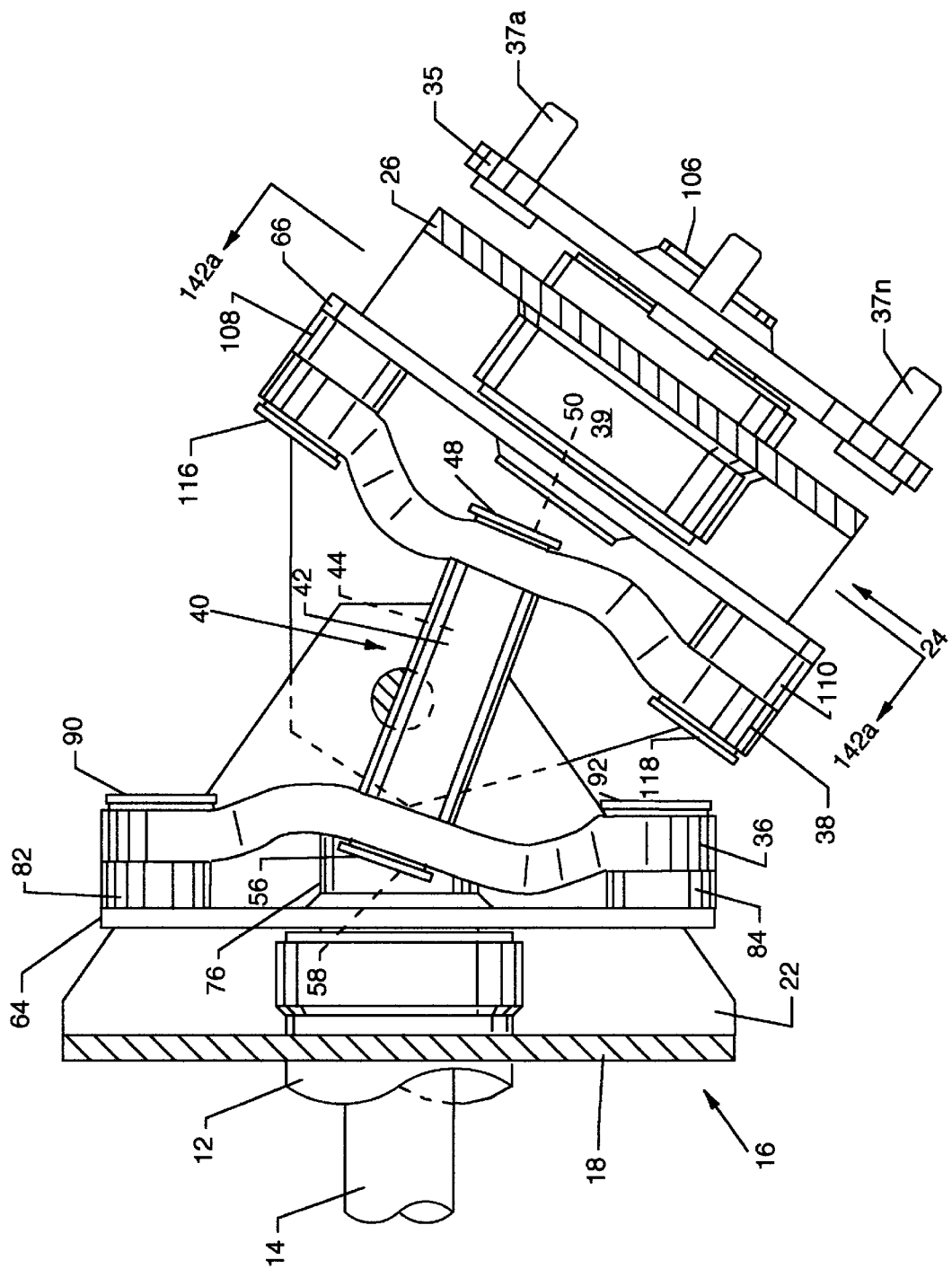
FIG. 7 illustrates the members of FIG. 6 where discs 36 and 38 have advanced 90° in rotation.

FIG. 7 illustrates the members of FIG. 6 where the flexible discs 36 and 38 have advanced 90° in rotation with respect to FIG. 6, where all numerals correspond to those elements previously and otherwise described. Illustrated in particular is the flexing of the inner and outer flexible discs 36 and 38 about the vertically aligned joint connector 40 with respect to the horizontally aligned yokes 64 and 66 at a point in time where flexible disc rotation is advanced 90° with respect to the flexible disc position illustrated in FIG. 6. At this point of rotation, where the joint connector 40 is positioned vertically, the flexible discs exhibit mirror-like image flexings where the discs 36 and 38 are flexed about vertical axii defined as a line through the outer ends of the cylindrical members 42 and 44 where the cylindrical members 42 and 44 meet the disc 38, the 12 o'clock and 6 o'clock position, and a line through the inner ends of the cylindrical members 42 and 44 where the cylindrical members 42 and 44 meet the disc 36, the 12 o'clock and 6 o'clock positions. Flexing of the flexible discs 36 and 38 exhibit different degrees of flexing between the positions illustrated in FIGS. 6 and 7 as the discs are rotated between the 0° and 90° positions and, of course, are repeated in various degrees of flex throughout the remaining 270° of rotation to provide a constantly flexing flexible coupling and to absorb axial reciprocation of component members. As steering input is relieved or reduced, the discs 36 and 38, being sprung and flexed, return to the flat disc memory position, thus returning the wheel bearing housing 24 into straight ahead steering alignment as opposed to most other constant velocity joints which do not automatically return to a neutral straight ahead positioning.

Figure 8:
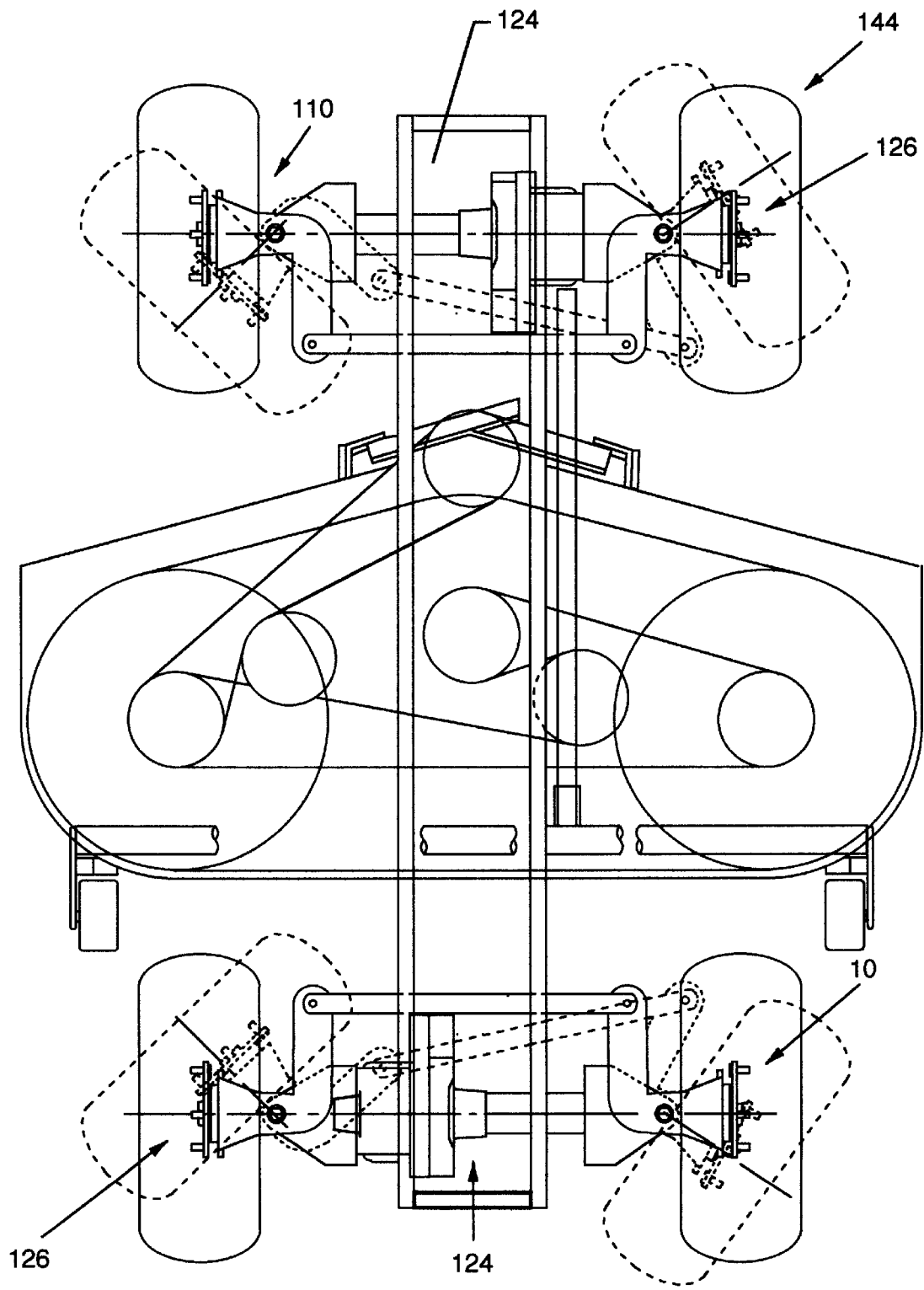
FIG. 8 illustrates the utilization of a plurality of constant velocity flexible couplings with a 4-wheel drive/steer tractor.

FIG. 8 illustrates the use of opposing and similar constant velocity flexible couplings 10 and 126 mounted on differential drive assembly 124 with a 4-wheel steer/drive tractor 144 in a left turn, where all numerals correspond to those elements previously and otherwise described.

Figure 9:
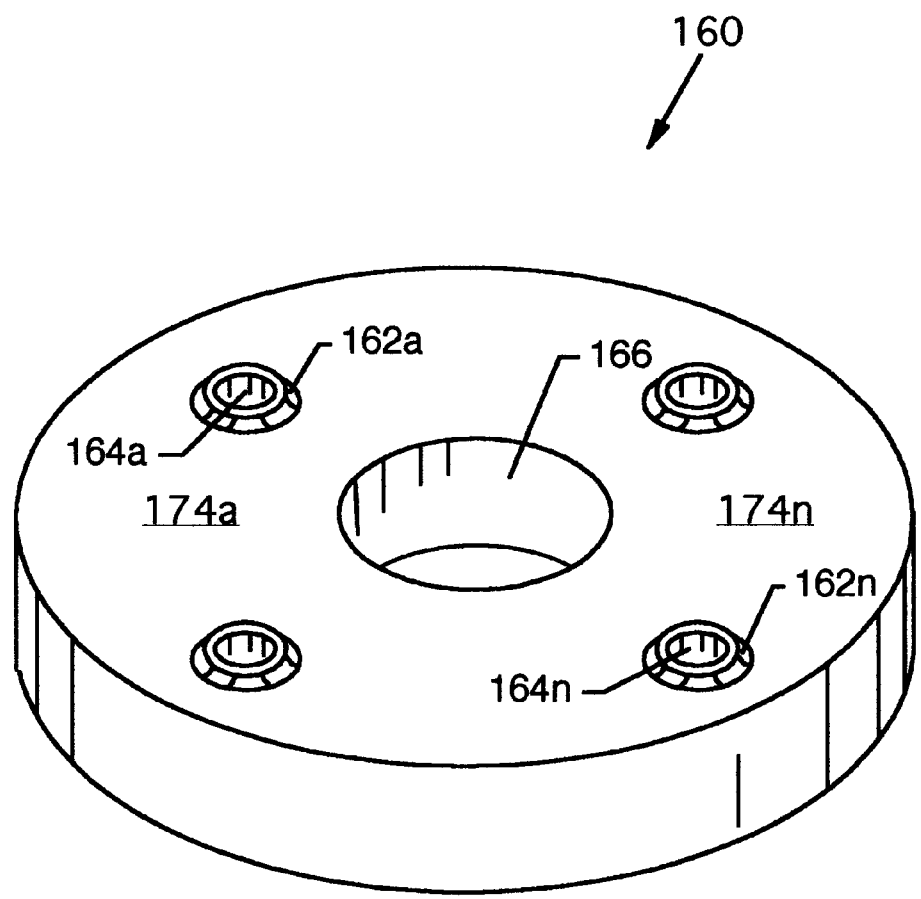
FIG. 9 illustrates a perspective view of the first alternative embodiment.

FIG. 9 illustrates a perspective view of the first alternative embodiment, where all numerals correspond to those elements previously and otherwise described. A disk-shaped constant velocity flexible coupling 160 made of a polymer urethane elastomer, such as K-Prene or other suitable polymer, includes a plurality of raised bosses 162a–162n and a plurality of extended metal inserts 164a–164n. Flexible coupling disc 160 can be used in place of both the inner flexible disc 36 and the outer flexible disc 38 of the present invention as previously described. The flexible coupling disc 160 has a centrally located hole 166 to accommodate the yolk bushing 76 and the end of the shaft 14, if required, as shown in FIG. 2. Also illustrated in this figure are areas 174a–174n which are located equal distance between raised bosses 162a–162n.

Figure 10:
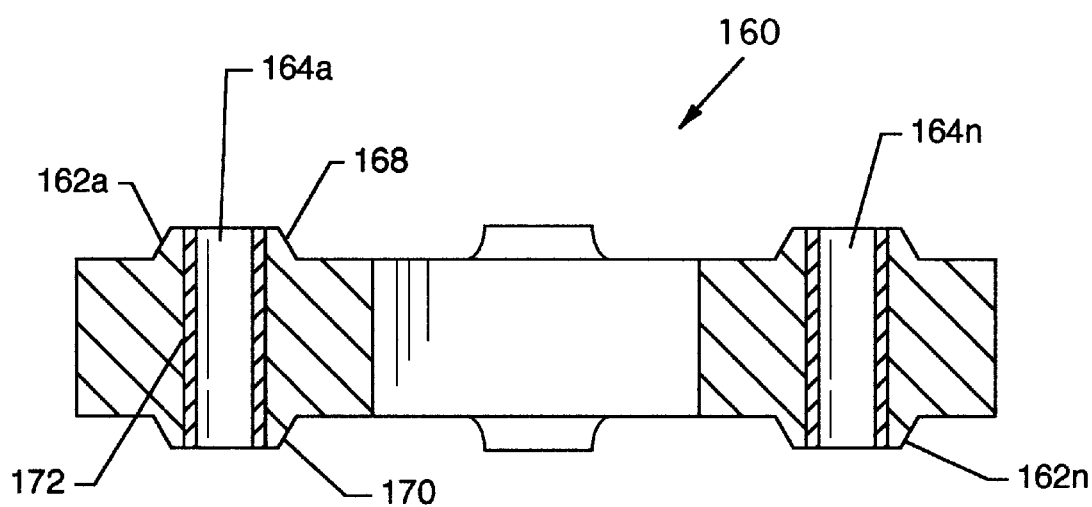
FIG. 10 illustrates a cross sectional view of the first alternative embodiment.

FIG. 10 illustrates a cross sectional view of the flexible coupling disc 160, where all numerals correspond to those elements previously and otherwise described. Illustrated in particular is the assembly of the metal inserts 164a–164n which extend from the upper portion 168 to the lower portion 170 of the raised bosses 162a–162n. Metal inserts 164a–164n are permanently secured to the inner wall 172 of the flexible coupling disc 160. The taper of the raised bosses 162a–162n prevents stress on the polymer urethane elastomer when flexed which further prevents the polymer urethane elastomer from pulling away from the metal inserts 164a–164n by shifting the stress to the areas 174a–174n shown in FIG. 11.

Figure 11:
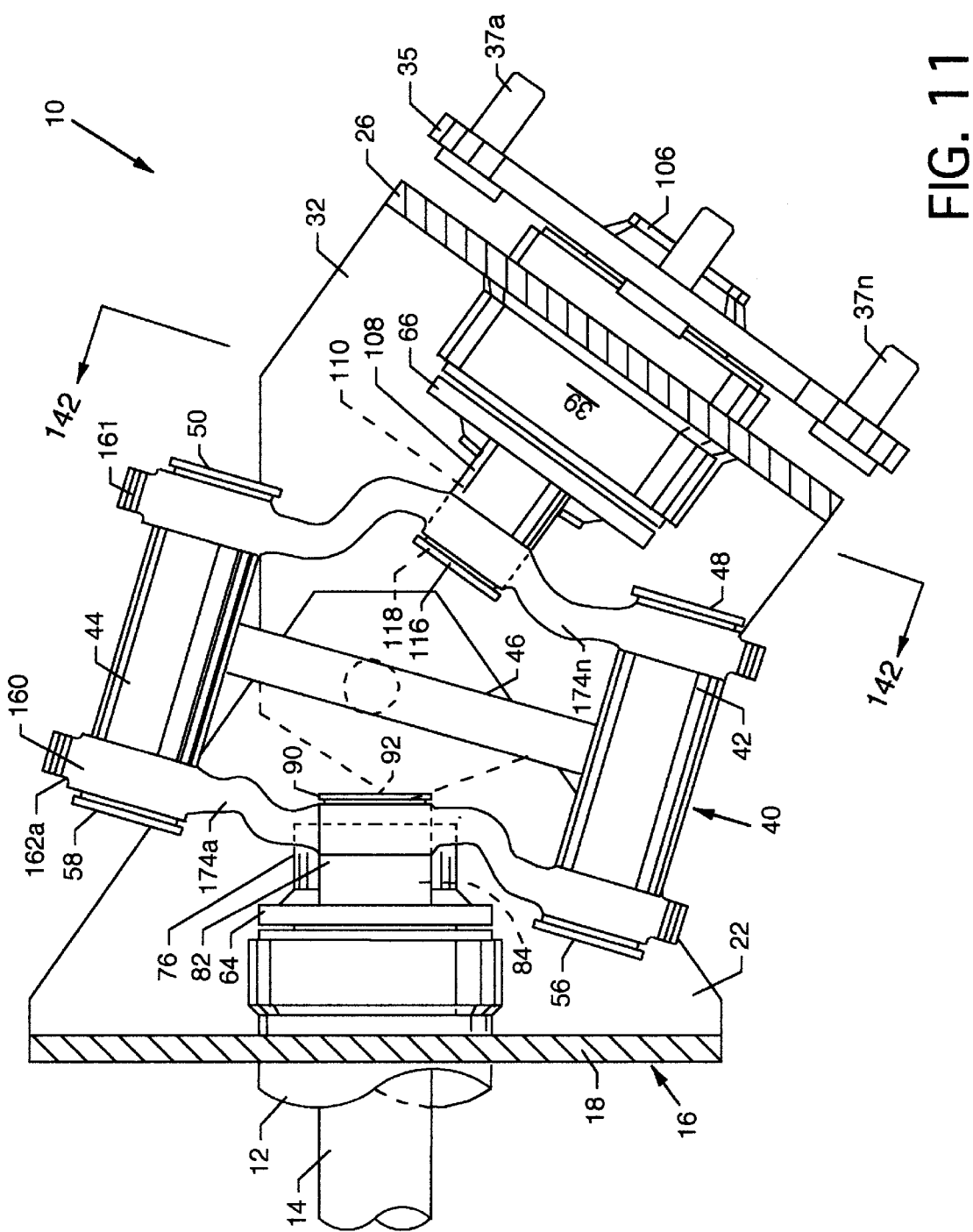
FIG. 11 illustrates a cutaway view of the constant velocity flexible coupling 10 in a turn to the left incorporating flexible coupling discs 160 and 161.

FIG. 11 illustrates the members of FIG. 6 where the flexible coupling discs 160 and 161 have advanced 90° in rotation with respect to FIG. 6, where all numerals correspond to those elements previously and otherwise described. Illustrated in particular is the flexing of the flexible coupling discs 160 and 161 about the vertically aligned joint connector 40 with respect to the horizontally aligned yokes 64 and 66 at a point in time where flexible disc rotation is advanced 90° with respect to the flexible disc position illustrated in FIG. 6. At this point of rotation, where the joint connector 40 is positioned vertically, the flexible discs exhibit mirror-like image flexings where the flexible coupling discs 1060 and 161 are flexed about vertical axii defined as a line through the outer ends of the cylindrical members 42 and 44 where the cylindrical members 42 and 44 meet the flexible coupling disc 161, the 12 o'clock and 6 o'clock position, and a line through the inner ends of the cylindrical members 42 and 44 where the cylindrical members 42 and 44 meet the flexible coupling disc 160, the 12 o'clock and 6 o'clock positions. Flexing of the flexible coupling discs 160 and 161 exhibit different degrees of flexing between the positions illustrated in FIGS. 6 and 7 as the discs are rotated between the 0° and 90° positions and, of course, are repeated in various degrees of flex throughout the remaining 270° of rotation to provide a constantly flexing flexible coupling and to absorb axial reciprocation of component members. As steering input is relieved or reduced, the flexible coupling discs 160 and 161, being sprung and flexed, return to the flat disc memory position, thus returning the wheel bearing housing 24 into straight ahead steering alignment as opposed to most other constant velocity joints which do not automatically return to a neutral straight ahead positioning. Also illustrated in FIG. 11 is the transfer of stress from the raised bosses 162a–162n to the central area 174a–174n when the flexible coupling discs are flexed.

Figure 12:
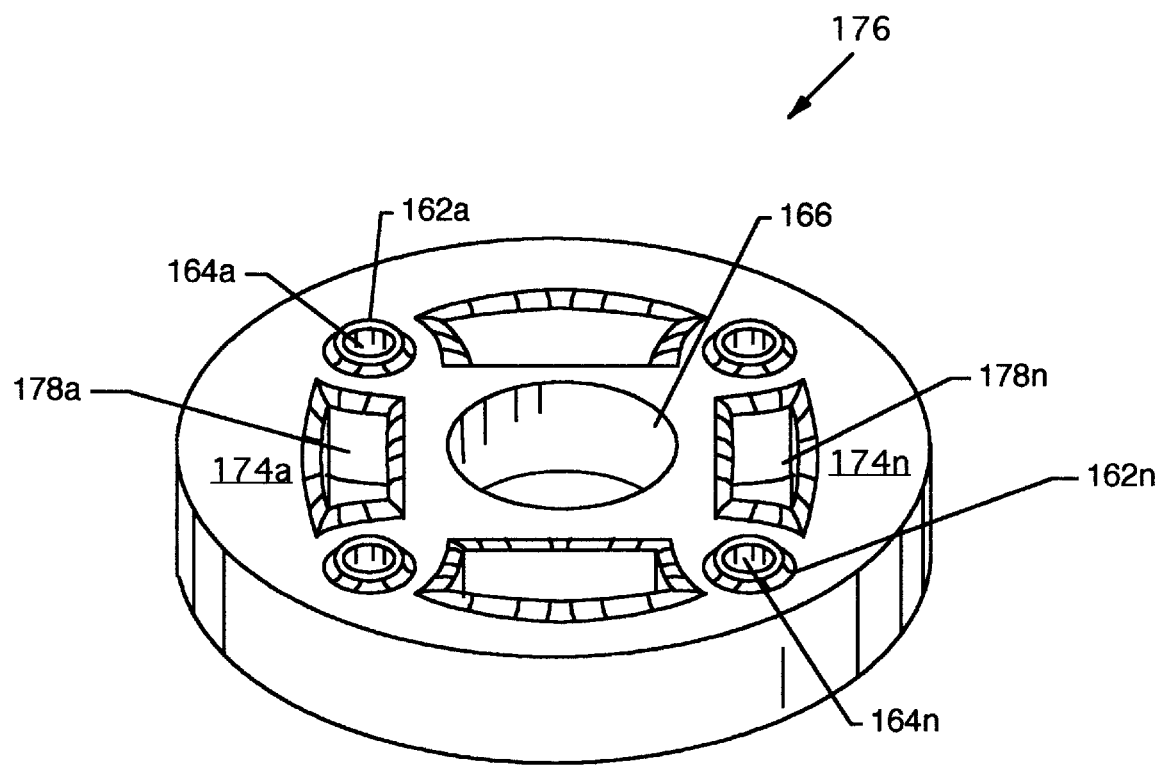
FIG. 12 illustrates a perspective view of the second alternative embodiment.

FIG. 12 illustrates a perspective view of the second alternative embodiment, where all numerals correspond to those elements previously and otherwise described. A constant velocity flexible coupling disk 176 which is constructed similar to the first alternative embodiment and additionally includes a plurality of recessed areas 178a–178n correspondingly aligned to areas 174a–174n. Recessed areas 178a–178n lead to a lesser disk thickness than the corresponding adjacent disk thickness, which increases the flexibility of the flexible coupling disk 176 when flexed. The location of recessed areas 178a–178n also reduces the tendency of the urethane disk to separate from metal inserts 164a–164n when stressed without compromising the durability of the flexible coupling disk.

Figure 13:
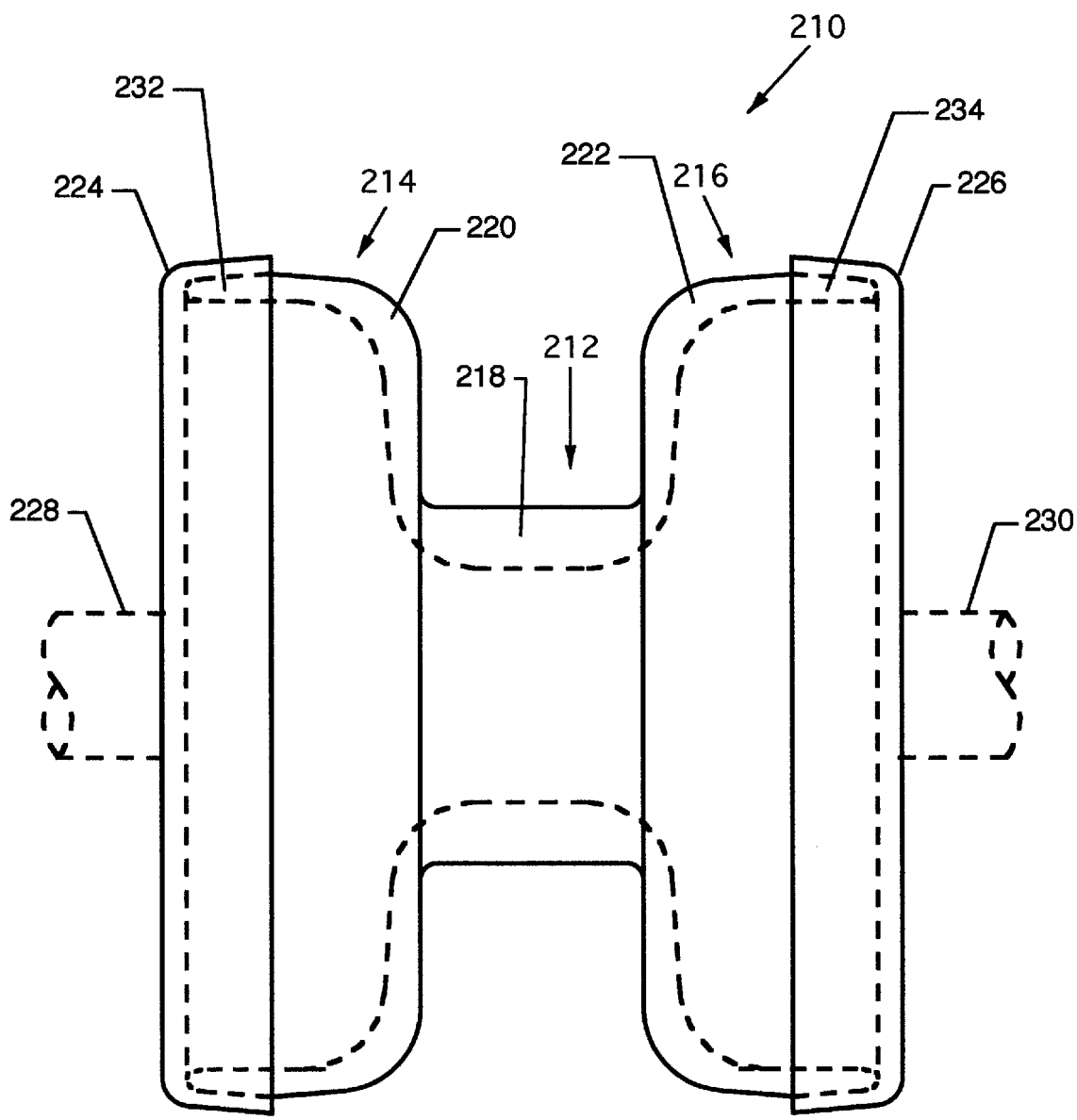
FIG. 13 illustrates a front view of a constant velocity flexible interface, the third alternative embodiment.

FIG. 13 illustrates a front view of a constant velocity flexible interface 210, the third alternative embodiment, which is constructed of urethane or like material and having an inner portion 212 which extends outwardly from the center to two opposing outer portions 214 and 216. The inner portion 212 has a relatively thick wall 218 and the outer portions 214 and 216 have relatively thin walls 220 and 222. The relatively thin walls 220 and 222 of outer portions 214 and 216 form opposing annular lips 232 and 234 as shown in FIG. 13.

The constant velocity flexible interface 210 incorporates mounting plates 224 and 226 constructed of steel or like material, which connect a differential axle 228 and a wheel axle 230 to the outer portions 214 and 216 of the constant velocity flexible interface 210. The method of securation will later be described in detail in conjunction with FIG. 14.

Figure 14:
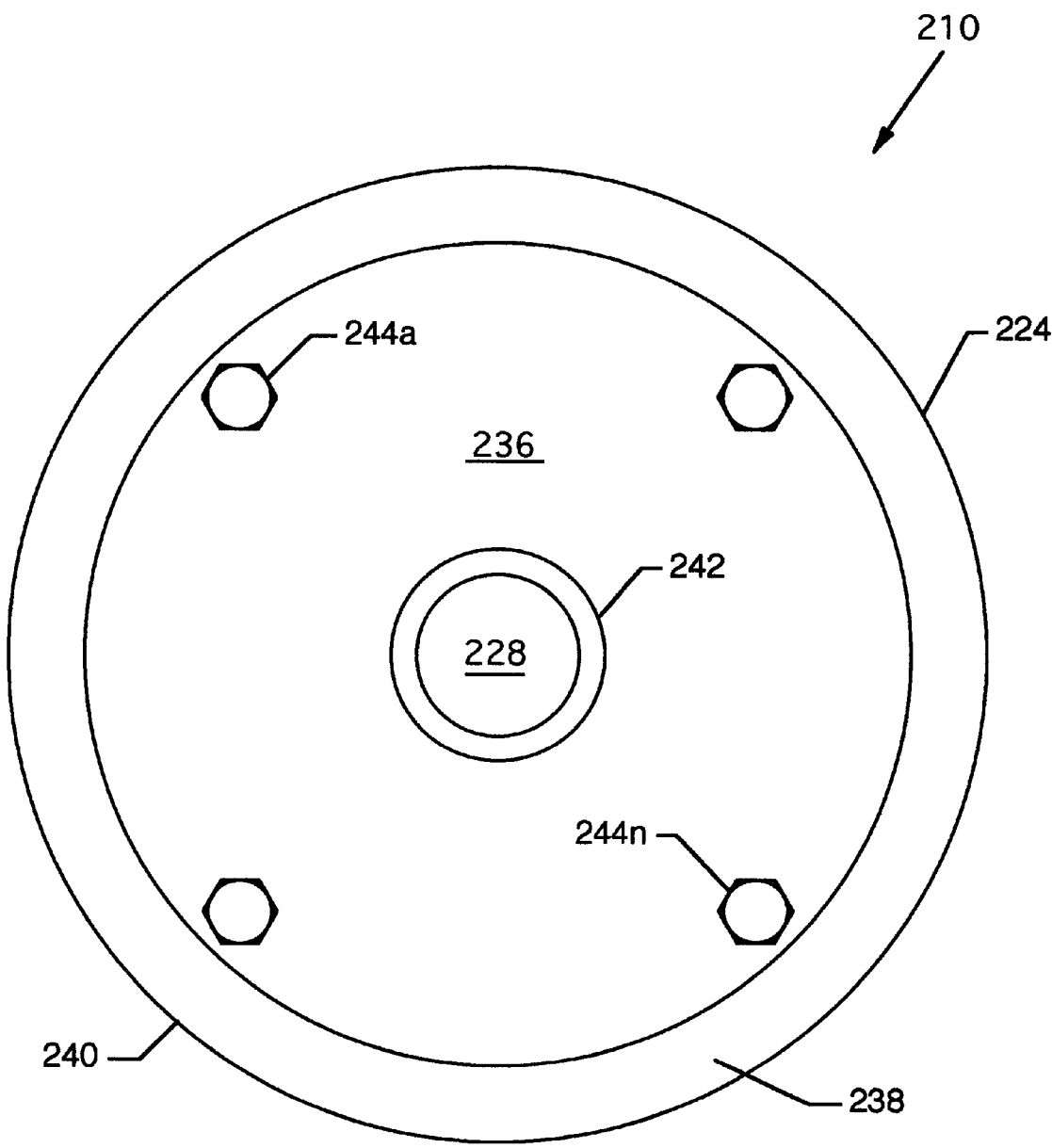
FIG. 14 illustrates an end view of the constant velocity flexible interface.

FIG. 14 illustrates an end view of the constant velocity flexible interface 210, where all numerals correspond to those elements previously and otherwise described. Illustrated in detail is mounting plate 224 having a recessed planar area 236, a curved area 238 and an angled straight section 240 with respect to planar area 236. Located in the center of planar area 236 is a cylindrical axle mount sleeve 242 which is welded or otherwise suitably secured to the mounting plate 224. A plurality of screws 244a–n secure mounting plate 224 to the outer portion 214 of the constant velocity flexible interface 210 (not shown). The method of securation will later be described in detail in conjunction with FIG. 15.

Figure 15:
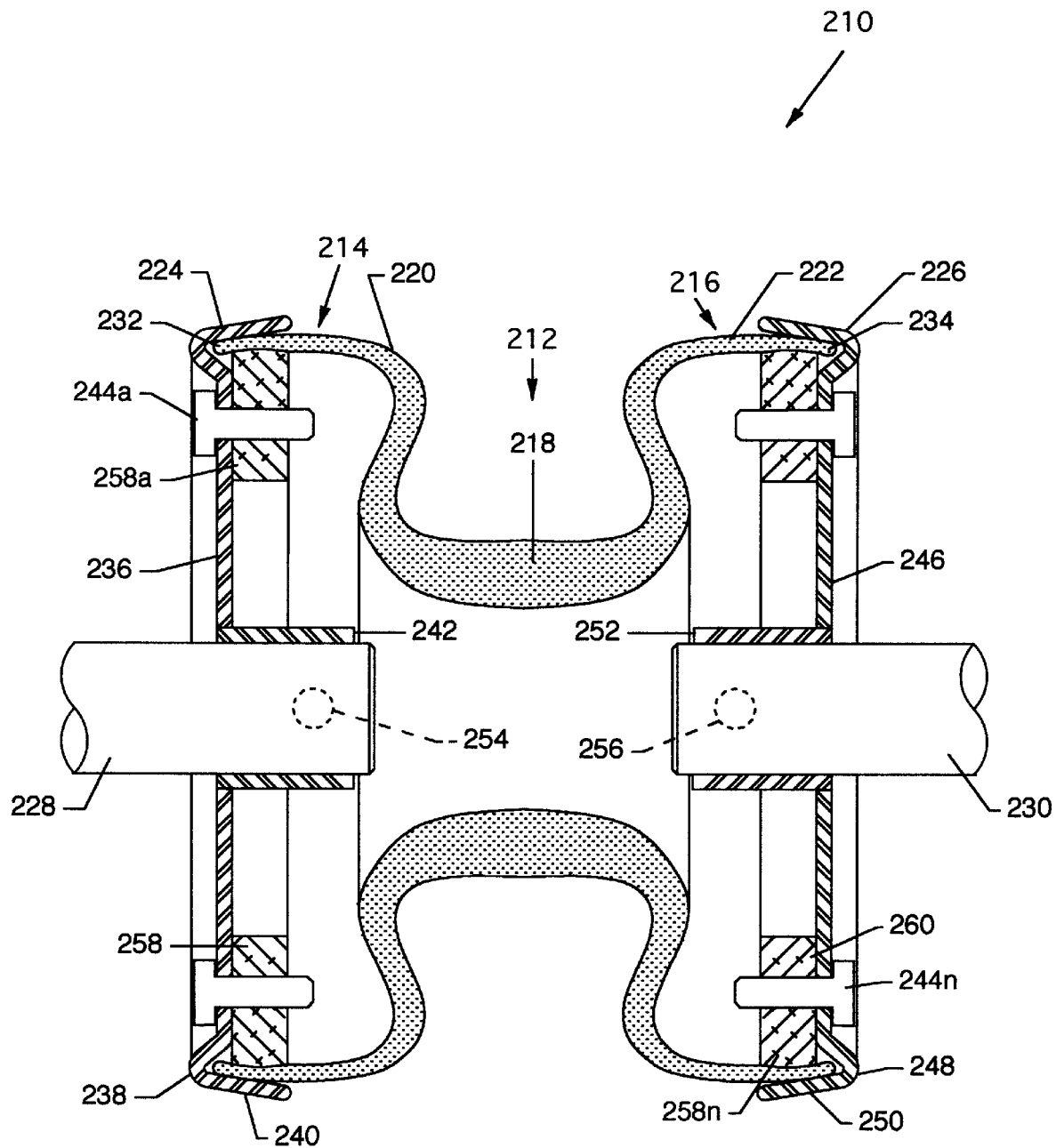

FIG. 15 illustrates a cross-sectional view of the constant velocity flexible interface 210, where all numerals correspond to those elements previously and otherwise described. Shown in detail is the method of securation of mounting plates 224 and 226 to the outer portions 214 and 216, respectively, of the constant velocity flexible interface 210. Mounting plate 226 has a recessed planar area 246, a curved area 248, an angled straight section 250, and an axle mount sleeve 252 identical to that of mounting plate 224. Screws or like fasteners pass through holes 254 and 256 in the axle mount sleeves 242 and 252 and respectively, secure the differential axle 228 and wheel axle 230 thereto. Annular wedge plates 258 and 260 are aligned on the interior of annular lips 232 and 234, respectively, and mounting plates 224 and 226 are then positioned over the exterior of annular lips 232 and 234 as shown in FIG. 16. A plurality of screws 244a–244n then pass through annular wedge plates 224 and 226 and annular wedge plates 258 and 260. When screws 244a–244n are torqued in the geometry of the annular wedge plates 258 and 260 in conjunction with the geometry of the angled straight portions 240 and 250 of mounting plates 224 and 226 the frictional engagement forces annular capture of opposing annular lips 232 and 234.

FIG. 16 illustrates a cutaway view of the constant velocity flexible coupling 262 in a turn to the left incorporating the constant velocity flexible interface 210, where all numerals correspond to those elements previously and otherwise described. The constant velocity flexible coupling 262 is constructed using many of the principles taught in the preferred embodiment and includes a housing member 264, shaft member 266, mounting bracket 268, vertical member 270, bottom member 272, wheel bearing housing 274, vertical planar member 276, angled planar member 278, wheel flange 280, studs 282a–282n, bearing 284 and shaft 286 which operate similarly to the preferred embodiment.

FIG. 17 illustrates an exploded view of the fourth alternative embodiment, where all numerals correspond to those elements previously and otherwise described. Illustrated in particular are alternative inner drive components which function similar to the inner drive components described in the previous embodiments. Now described is geometric member 310, having bores 312 and 314 which extend through the geometric member 310 parallel to ends 316 and 318 as illustrated. Geometric member 310 connects two flexible coupling disks 320 and 322 which is constructed and function similar to flexible coupling disk 176 described in FIG. 12, having centrally located holes 321 and 323, plurality of recessed areas 324a–324n and 326a–326n, a plurality of raised bosses 328a–328n and 330a–330n, a plurality of stainless steel inserts 332a–332d and 334a–334d which are bonded to the flexible coupling disks 320 and 322 using a high strength adhesive prior to molding. Flexible coupling disks 320 and 322 are secured together by means of fasteners, such as but not limited to bolts 336 and 340 which pass through stainless steel inserts 334b and 334d, respectively, then continue through bores 312 and 314, stainless steel inserts 332b and 332d, respectively, and secure by means of fasteners such as but not limited to nuts 338 and 342, respectively. Geometric member 310 acts a spacer between flexible coupling disks 320 and 322 providing space for the disks to flex more easily when stressed. Alternatively, ball and socket joints may be molded into the flexible coupling disks rather than the stainless steel inserts. The ball and socket joints also facilitate flexing of the flexible coupling disks.

Comparing FIG. 17 to similar FIG. 2, geometric spacer 310 replaces or substitutes for earlier joint connector 40. As with the first embodiment, geometric spacer 310 does not change in shape during operation of the fourth embodiment. The flexible discs 320 and 322 flex when steering occurs during shaft rotations, similar to that which is shown in FIGS. 6, 7 and 11. In other words, geometric spacer 310 will be understood to be rigid. Moreover, when assembled, opposed portions, such as inserts 332b and 332d of the first flexible disc member 320, are rigidly connected to each other by the geometric spacer 310 and to corresponding opposed portions such as inserts 334b and 334d on the second flexible disc member 322. The geometric spacer 310, therefore, provides a rigid but spaced apart alignment relationship between the opposed portions such as inserts 332b, 332d, 334b and 334d similar to the relationship between opposed bores 50 and 52 of one flexible disc, and opposed bores 60 and 62 of a second flexible disc in the first embodiment. The inserts 332a–332d of flexible disc 320 are radially distributed about a centrally located hole 321, The inserts 334a–334d of flexible disc 322 are radially distributed about a centrally located hole 323.

Also illustrated in FIG. 17 are yokes 344 and 346 are constructed similarly having extruded studs 348, 350, 352 and 354 which extend perpendicularly from planar members 356 and 358. Yokes 344 and 346 include centrally located hollow cylindrical extrusions 364 and 366 and centrally located holes 360 and 362 in planar members 356 and 358 as illustrated. Cylindrical extrusion 364 includes bores 368 and 369 wherein a fastener secures yoke 344 over and about shaft member 14 which is described in the preferred embodiment. Similarly, cylindrical extrusion 366 includes bores 370 and 371 wherein a fastener secures yoke 346 over and about shaft 106 which is also described in the preferred embodiment. Extruded studs 348 and 350 frictionally engage stainless steel inserts 332a and 332c, respectively. Likewise, extruded studs 352 and 354 frictionally engage stainless steel inserts 334a and 334c. When incorporated into the preferred embodiment, all components remain secure between mounting bracket 16 and wheel bearing housing 24, shown in FIG. 1. FIG. 18 illustrates a side view of the fourth alternative embodiment, where all numerals correspond to those elements previously and otherwise described. Illustrated in particular is the perpendicular orientation of yoke 344 to geometric member 310 (shown in ghost).

The present invention provides the controlled steering of a four-wheel driven vehicle, such as a lawn mower. In such applications, the flexible coupling disc has a diameter of between about 5 to 7 inches and a thickness of between about ⅝th to ¾th inches. In one embodiment for use with a wheel driven lawn mower, the diameter of each disc member was 6 inches, the thickness of each disc member was about 0.71 inch and the gap distance between adjacent disc members was about 3 inches from the centerline of the discs through the center axis of the discs. It is believed that the ratio between the diameter, the thickness and the gap distance is relatively constant with respect to the type of driven vehicle. That is, as the disc diameter increases, the thickness and gap distance also increases.

The Durometer measurement of the material hardness of the flexible disc falls within the range of hardness of between about 80 to 95, with a preferred range of between about 89–92. Also, it is within the scope of the present invention that the flexible disc may be comprised of a one-piece molding or of a laminated structure provided the Durometer measurement range is satisfied.

CONSTANT VELOCITY FLEXIBLE COUPLING
PARTS LIST

| | |
|---|---|
| 10 | constant velocity flexible coupling |
| 12 | housing member |
| 14 | shaft member |
| 16 | mounting bracket |
| 18 | vertical member |
| 20 | top member |
| 22 | bottom member |
| 24 | wheel bearing housing |
| 26 | vertical planar member |
| 28 | angled planar member |
| 30 | bell crank member |
| 32 | angled planar member |
| 34 | planar member |
| 35 | wheel flange |
| 36 | inner flexible disc |
| 37a-n | studs |
| 38 | outer flexible disc |
| 39 | bearing |
| 40 | joint connector |
| 42 | cylindrical member |
| 42a | bore |
| 44 | cylindrical member |
| 44a | bore |
| 46 | central connecting member |
| 48 | fastener |
| 50 | fastener |
| 52 | hole |
| 54 | hole |
| 56 | fasteners |
| 58 | fasteners |
| 60 | hole |
| 62 | hole |
| 64 | yoke |
| 66 | yoke |
| 68 | bore |
| 70 | central bore |
| 72 | outer bore |
| 74 | outer bore |
| 76 | yoke bushing |
| 78 | fastener bore |
| 80 | central bore |
| 82 | spacer |
| 84 | spacer |
| 86 | central bore |
| 88 | central bore |
| 90 | fastener |
| 92 | fastener |
| 94 | hole |
| 96 | hole |
| 98 | hole |
| 100 | central bore |
| 102 | outer bore |
| 104 | outer bore |
| 106 | shaft |
| 108 | spacer |
| 110 | spacer |
| 112 | central bore |
| 114 | central bore |
| 116 | fastener |
| 118 | fastener |
| 120 | hole |
| 122 | hole |
| 124 | differential drive assembly |
| 126 | constant velocity flexible coupling |
| 130 | nut and bolt assembly |
| 132 | bore |
| 134 | upper pivot bolt and washer assembly |
| 136 | lower pivot bolt and washer assembly |
| 138 | control link |
| 140 | pivot |
| 142 | view line |
| 142a | view line |
| 144 | tractor |
| 160 | flexible coupling disc |
| 161 | flexible coupling disc |
| 162a-n | raised boss |

-continued

CONSTANT VELOCITY FLEXIBLE COUPLING
PARTS LIST

| | |
|---|---|
| 164a-n | metal insert |
| 166 | hole |
| 168 | upper portion |
| 170 | lower portion |
| 172 | inner wall |
| 174a-n | area |
| 176 | flexible coupling disk |
| 178a-n | recessed area |
| 210 | constant velocity flexible interface |
| 212 | inner portion |
| 214 | outer portion |
| 216 | outer portion |
| 218 | relatively thick wall |
| 220 | relatively thin wall |
| 222 | relatively thin wall |
| 224 | mounting plate |
| 226 | mounting plate |
| 228 | differential axle |
| 230 | wheel axle |
| 232 | annular lip |
| 234 | annular lip |
| 236 | recessed planar area |
| 238 | curved area |
| 240 | angled straight section |
| 242 | axle mount sleeve |
| 244a-n | screws |
| 246 | recessed planar area |
| 248 | curved area |
| 250 | angled straight section |
| 252 | axle mount sleeve |
| 254 | hole |
| 256 | hole |
| 258 | annular wedge plate |
| 260 | annular wedge plate |
| 262 | constant velocity flexible coupling |
| 264 | housing member |
| 266 | shaft member |
| 268 | mounting bracket |
| 310 | geometric member |
| 312 | bore |
| 314 | bore |
| 316 | end |
| 318 | end |
| 320 | flexible coupling disk |
| 321 | hole |
| 322 | flexible coupling disk |
| 323 | hole |
| 324a-n | recessed areas |
| 326a-n | recessed areas |
| 328a-n | raised bosses |
| 330a-n | raised bosses |
| 332a-d | stainless steel inserts |
| 334a-d | stainless steel inserts |
| 336 | bolt |
| 338 | nut |
| 340 | bolt |
| 342 | nut |
| 344 | yoke |
| 346 | yoke |
| 348 | extruded stud |
| 350 | extruded stud |
| 352 | extruded stud |
| 354 | extruded stud |
| 356 | planar member |
| 358 | planar member |
| 360 | bore |
| 362 | bore |
| 364 | cylindrical extrusion |
| 366 | cylindrical extrusion |
| 368–371 | bores |

Various modifications can be made to the present invention without departing from the apparent scope hereof.

It is claimed:

1. A flexible coupling for use in connecting a vehicle's drive shaft to a vehicle's wheel flange, said flexible coupling including:

first and second flexible disc members, said first flexible disc member operatively connectable to a drive shaft and said second flexible disc member spaced apart from said first flexible disc member and operatively connectable to a wheel flange so as to transmit power and to allow steering wherein opposed portions of the first flexible disc member are rigidly connected to each other and to opposed portions on the second flexible disc member by a rigid spacer member.

2. The coupling in accordance with claim 1, wherein said flexible disc members include raised boss members at said rigidly connected opposed portions of the first and second flexible disc members and recessed areas adjacent said rigidly connected portions which distribute the stresses within said flexible disc members during steering of the vehicle.

3. The flexible coupling of claim 1, wherein said flexible coupling disc members have a central hole and four bores radially spaced about the central hole, each of the four bores of the first flexible disc member and each of the four bores of the second flexible disc member, further include a metal insert, each metal insert bonded to each respective bore of the flexible disc member and adapted to accept a fastener.

4. A flexible drive coupling for transmitting power to a steerable wheel of a vehicle, the flexible drive coupling comprising:

a. a first rotatable yoke, the yoke being connectable to a drive shaft of a vehicle at a central hole of the first rotatable yoke, the first rotatable yoke having a pair of studs spaced apart from the central hole of the first rotatable yoke;

b. an inner flexible coupling disc constructed from a member of the group consisting of rubber, polyurethane, urethane elastomers and polymers, having a central hole and four outer bores, said outer bores spaced apart from the central hole and arranged at 90° intervals about the central hole, said inner flexible coupling disc connected to the first rotatable yoke by the pair of studs of the first rotatable yoke through a first pair of the outer bores to the yoke, wherein the first pair of outer bores are opposed and arranged at a 180° interval about the central hole of the inner flexible disc;

c. a rigid geometric spacer, the rigid geometric spacer having a first end and a second end and having a pair of longitudinal spacer bores, the spacer bores being parallel to the first and second ends, for alignment with a second pair of the four outer bores of the inner flexible disc, the second pair of bores of the inner flexible disc being opposed and arranged at a 180° interval about the central hole and at a 90° interval from the first pair of outer bores of the inner flexible disc and the pair of studs of the first rotatable yoke;

d. an outer flexible disc constructed from a member of the group consisting of rubber, polyurethane, urethane elastomers and polymers, having a central hole and four outer bores, the four outer bores spaced apart from the central hole of the outer flexible disc and arranged at 90° intervals about the central hole, with a first pair of the four outer bores being opposed and arranged at a 180° interval about the central hole of the outer flexible disc and aligned with the longitudinal spacer bores of said rigid geometric spacer member;

e. a second rotatable yoke with a central hole for connection to a second rotatable shaft and a pair of studs connected to a second pair of the four outer bores of the outer flexible disc, the second pair being opposed and arranged at a 180° interval about the central hole and at a 90° interval from the first pair of outer bores; and f. a pair of longitudinally extending fasteners, connecting the inner flexible disc to the rigid geometric spacer and to the outer flexible disc by extending through and maintaining a rigid but spaced apart alignment relationship between the second pair of bores of the inner flexible disc and the first pair of the four outer bores of the outer flexible disc with the spacer bores interposed therebetween.

5. The flexible drive coupling of claim 4, wherein each of said four outer bores of said inner flexible disc and each of said four outer bores of said outer flexible disc include a stainless steel insert bonded into the bore, a raised boss on each side of said bore, and a recessed area on each side of said bore between opposing pairs of said bores.

6. The flexible drive coupling of claim 5, wherein the studs of the first and second yokes are extruded and frictionally engage the stainless steel inserts.

* * * * *